United States Patent
Black et al.

(10) Patent No.: US 6,430,456 B1
(45) Date of Patent: Aug. 6, 2002

(54) EFFICIENT PROCESS TOOL UTILIZATION IN SEMICONDUCTOR MANUFACTURING USING AN ADDITIONAL PROCESS TOOL STATE

(75) Inventors: Hang Thi Yen Black; Arturo Nicholas Morosoff, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/362,636

(22) Filed: Jul. 26, 1999

(51) Int. Cl.$^7$ .............................................. G06F 19/00
(52) U.S. Cl. ...................... 700/110; 700/108; 700/111; 700/178; 700/175; 700/179; 700/177; 438/5; 438/14; 702/182; 702/186
(58) Field of Search ................................ 700/108, 109, 700/110, 111, 178, 175, 177, 179, 107; 73/9, 37.5, 862.68; 451/42; 365/226; 438/5, 14; 702/182–186

(56) References Cited

U.S. PATENT DOCUMENTS

| | | | |
|---|---|---|---|
| 5,105,362 A | * 4/1992 | Kotani | 700/121 |
| 5,458,732 A | * 10/1995 | Butler et al. | 216/61 |
| 5,570,990 A | * 11/1996 | Bonora et al. | 414/543 |
| 5,654,903 A | * 8/1997 | Reitman et al. | 700/108 |
| 5,946,215 A | * 8/1999 | Mito | 700/180 |
| 6,192,287 B1 | * 2/2001 | Solomon et al. | 700/110 |

\* cited by examiner

Primary Examiner—Ramesh Patel
(74) Attorney, Agent, or Firm—Kevin L. Daffer; Conley, Rose & Tayon P.C.

(57) ABSTRACT

A method, system, and storage medium for increasing the efficiency of integrated circuit (IC) manufacture by improvements in manufacturing equipment usage are provided. Process tools are assigned to one of three operating states: up, down, or conditional. In the up state, process tools are available for manufacturing. After certain manufacturing steps, the quality of the ICs being made upon wafers is evaluated. If potentially defective ICs are found, process tools that have processed the wafer may be placed in the conditional state. In this state, process tools are allowed to continue manufacturing, albeit only for a limited period. The conditional state gives personnel time to determine which process tool is responsible for the defective product. The responsible process tool is then placed in the down state while all others are placed back in the up state. Once the problem with the process tool in the down state is presumably repaired, it is placed in the conditional state. If the limited quantity of wafers then processed by the process tool are found to be acceptable, the tool is placed in the up state; otherwise, it is placed back in the down state. The conditional state allows personnel to investigate the problem without halting production and determine the exact process tool to take out of production while the limited period of the conditional state limits the quantity of potentially defective product.

30 Claims, 5 Drawing Sheets

EFFICIENT PROCESS TOOL UTILIZATION IN SEMICONDUCTOR MANUFACTURING USING AN ADDITIONAL PROCESS TOOL STATE

BACKGROUND OF THE INVENTION

1. Field of the Invention

This invention relates to manufacturing methods and, more particularly, to a method, system, and storage medium for increasing the efficiency of integrated circuit manufacturing by improving manufacturing equipment utilization.

2. Description of the Relevant Art

Manufacture of integrated circuits (ICs) upon semiconductor substrates ("wafers") involves numerous pieces of equipment ("process tools") and manufacturing steps. Evaluation of the quality of the ICs during manufacture is important to assure that the completed ICs will be functional. After each processing step, the quality of the ICs being manufactured could be evaluated; however, the number of steps is so large that it is not practical to evaluate after every step. Instead, evaluation occurs only after certain processing steps during manufacturing. Typically, not every wafer is evaluated but representative wafers are evaluated after a set number of wafers have been processed.

The evaluation of wafers typically includes making some type of measurement and then comparing the measurement result to an established acceptable range. The measurement can take many forms including inspection for quantity and type of defects on the surface of the wafer, measuring the response to electrical stimuli of various regions of the wafer, or determining the thickness and uniformity of a coating that has been deposited on the surface of the wafer. If the measurement result is found to be outside of the established acceptable range, one or more process tools are removed from use for manufacturing and these tools are referred to as being in the "down" state. Conversely, any process tool that is available for use is referred to as being in the "up" state.

In general, the processing flow of wafers is controlled by an automated factory system. This system is connected to the computers controlling the individual processing tools used in the IC manufacturing and the system also maintains a database of the current operating state of each tool. The system can accept a measurement result and can compare the result to a predetermined acceptable range and automatically place a process tool in the down state if the result is outside of the acceptable range. An example of an automated factory system is WorkStream™ sold by Consilium, Inc. of Mountain View, Calif.

Prior to a given measurement result being outside the acceptable range, many process tools may have been involved in the processing of the wafer. Multiple process tools therefore may have contributed to the result being outside the acceptable range. Some decision must be made as to which process tools to place in the down state. Generally, this decision is performed automatically by an automated factory system. The factory system is typically programmed to place the process tool most likely to have caused the result outside of the acceptable range in the down state. For example, certain types of defects on the wafer surface are often associated with a specific process tool. A potential difficulty occurs, however, if an incorrect process tool is placed in the down state. In such a case, the process tool in the down state, which is actually performing adequately, is not available for use while the process tool with an actual problem continues to produce defective ICs, thereby continuing to reduce efficiency and increase the cost of manufacturing.

During the time that a process tool is in the down state, personnel associated with the tool typically attempt to identify the problem and take corrective action. Once the problem is believed solved, the process tool may then be evaluated using test procedures, which may include usage of test wafers, to assure correct functioning before being placed back in the up state. A test wafer does not have functional ICs being manufactured upon it and, typically, is processed by only a single process tool and then evaluated to determine the functioning of that process tool.

The process tool, however, may not process test wafers in the exact same manner as product wafers, which are wafers upon which functional (sellable) ICs are being manufactured. The test wafers therefore may not be sensitive to a problem that could cause defective ICs to be manufactured. Although the test wafer may be found to be acceptable and the process tool placed in the up state, subsequent product wafers processed by the process tool may not be acceptable. It could be that the original problem, to which the test wafer is not sensitive, has not been corrected or that the original problem has been corrected but a new problem, to which the test wafer is not sensitive, has been created accidentally. For either case, defective ICs are produced resulting in reduced efficiency and increased cost of manufacturing.

Measurement results being outside the acceptable range can also be due to the integration or combination of manufacturing steps between process tools (often referred to as an "integration issue") instead of being due to a single tool. The state in which a process tool leaves a wafer can affect subsequent processing steps by other process tools. Any evaluation of a given process tool using a test wafer will not detect such a problem since the test wafer is processed by only the single tool. That process tool will then be placed back in the up state, but the original problem still may not have been addressed.

Measurement results being outside the acceptable range can sometimes cause process tools to be placed in the down state for problems that ultimately do not affect the functioning of the ICs. For example, certain process tools can induce defects on wafer surfaces in areas of the wafer that will not affect the performance of the completed ICs. These nuisance defects, however, will cause the process tool to be placed in the down state, necessitating personnel associated with the tool investigating for problems and then running test wafers before placing the process tool back in the up state. This results in a process tool that was performing adequately unnecessarily being removed from manufacturing for a period of time.

Individual process tools are also subject to routinely scheduled tests as an additional check on the tool's performance. Such tests are typically performed using test wafers so that the performance of the individual tool may be isolated. If the process tool fails the test, it is immediately placed in the down state. During the time that the process tool is down, personnel associated with the tool attempt to determine the problem and take corrective action. Once the process tool passes the test it previously failed, the process tool is often placed in the up state. No evaluation is necessarily made at this time, however, to ensure that product wafers are being processed correctly. Although the original problem was corrected, a new problem or integration issue, to which the test wafer is not sensitive, could have been created accidentally.

If a process tool is repeatedly placed in the down state unnecessarily, there may be a reduction in the responsiveness and efficiency of the personnel associated with that tool.

After a process tool is continually placed in the down state unnecessarily, for example, it may become routine for personnel to run a test wafer and place the tool back in the up state without even examining the tool. When an actual problem with the process tool occurs, the tool may be placed back into the up state if the test wafer is not sensitive to the problem. In this case, defective ICs will continue to be produced by the process tool.

Anytime a process tool is placed in the down state and thereby removed from production there is a decrease in efficiency and increase in cost of manufacturing ICs; however, a process tool producing defective ICs while remaining in the up state also causes a decrease in efficiency and increase in cost. It is also important to ensure that any process tool returned to the up state is not producing defective ICs. It is therefore desirable to develop an improved method of manufacturing control for removing the correct process tool or tools from production that are contributing to the production of defective ICs and ensuring that any process tool returned to production will not contribute to the production of defective ICs.

SUMMARY OF THE INVENTION

The problems outlined above are in large part addressed by a method in which process tools used in the manufacturing process have a third operating state, referred to as the "conditional" state, in addition to the up and down states. Process tools that are suspected of causing results outside the acceptable range in measured product wafers may be placed in the conditional state. Process tools in the conditional state are allowed to continue processing product wafers albeit for a limited period whereas process tools in the up state are enabled to process product wafers and process tools in the down state are disabled from processing process wafers. While the process tools are in the conditional state personnel investigate to determine the exact tool or tools causing the problem. This investigation can take many forms including inspecting the measured wafers with results outside the acceptable range and processing test wafers on process tools in the conditional state. Tools determined to be responsible for the measurement results outside the acceptable range are then placed in the down state while all others are placed back in the up state.

Process tools are not allowed to remain in the conditional state indefinitely. If a determination of responsibility for an unacceptable measurement is not made before an expiration point is reached, the process tools are automatically placed in the down state. Typically, the expiration point is set to be either a time-out period of time or after a fixed number of additional product wafers are processed by the process tool. The expiration point is set relative to the risk of production of defective ICs. If a specific process tool is known to often produce defective ICs, the expiration point can be set very short to minimize the risk of defective ICs being produced or the expiration point can even be set to zero to eliminate the risk completely. Additionally, if a set number of additional product wafers are found to have measurement results outside the acceptable range before the expiration point is reached, the process tool may also be automatically placed in the down state.

A process tool placed in the down state is examined by personnel associated with the tool in an attempt to determine the problem and take corrective action. Once the problem is believed solved, the process tool is then evaluated using a test wafer. If the process tool passes this test it is placed up to the conditional state; otherwise, it remains in the down state. After passing a test with a test wafer, a process tool placed in the conditional state is then allowed to process a set number of product wafers. If results from the measurement of these wafers are evaluated to be acceptable, the process tool is placed in the up state; otherwise, the tool remains in the conditional state. Wafers which cause a process tool to remain in the conditional state may be due to a new problem being accidentally created on the tool or may be due to the integration of manufacturing steps between process tools. If the process tool is determined to still be the problem, it is placed back in the down state for further examination and corrective action. If the problem is determined to be due to the integration of process steps between process tools, then the appropriate tools are placed in the down state for examination and corrective action.

If a process tool fails a routinely scheduled test, which isolates the performance of the tool, the process tool is placed in the down state. After the process tool has been subjected to examination and corrective action, the process tool is tested using the test it had previously failed. If the process tool now passes this test, it is placed in the conditional state. The process tool is then allowed to process a set number of product wafers. If measurement of these wafers yields results within the acceptable range, the process tool is placed in the up state; otherwise, the process tool is placed back in the down state for further examination and corrective action.

The conditional state allows personnel time to investigate and to determine the process tool or tools causing the problem. This provides an opportunity to prevent process tools that are functioning correctly from being placed in the down state and taken out of production. The limited period a process tool can remain in the conditional state limits the quantity of defective wafers produced in the event a tool is not functioning correctly. Additionally, if the cause of measurement results outside of the acceptable range is determined not to affect the functioning of the ICs, as in the case of nuisance defects, no process tool is unnecessarily taken out of production. Furthermore, requiring process tools that are in the down state to be placed in the conditional state after repair ensures that no process tool is allowed to process large quantities of product wafers until the tool has explicitly demonstrated it is functioning correctly for both test and product wafers. In this way process tools are kept in production as much as possible while minimizing the potential for production of defective ICs. Use of the conditional state may also improve the responsiveness and efficiency of personnel associated with a process tool. For example, a reduction in the number of times the process tool is placed in the down state that turn out to be unnecessary may increase the diligence exhibited by the personnel when that tool is placed in the down state. Increased efficiency and reduced cost of manufacturing are therefore believed to result.

In addition to the method described above, a system is contemplated herein. The system comprises a computer system, connected to process tools, in which measurement results of product and test wafers can be stored. A database, on the computer system, maintains a record of the operating states of process tools. A program executing on the computer system can compare a measurement result against a target result and make appropriate modification to the record of the operating state of process tools in the database. The target result comprises a predetermined acceptable range for the measurement result and the comparison includes determining if the measurement result falls within or outside the acceptable range.

A computer-readable storage medium is also contemplated herein. The storage medium contains program instructions which can be implemented by an executable unit to control process tools. The storage medium includes measurement data, target data, and evaluation data. The measurement data corresponds to measurement results of product wafers after certain processing steps while the target data corresponds to a predetermined acceptable range for measurement results. The evaluation data indicates whether a measurement results falls within or outside the acceptable range. The instructions cause the executable unit to select the operating state of a process tool based on the evaluation data.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed. On the contrary, the intention is to cover all modifications, equivalents, and alternatives falling within the spirit and scope of the present invention.

DETAILED DESCRIPTION OF THE PREFERRED EMBODIMENTS

Figure 1:
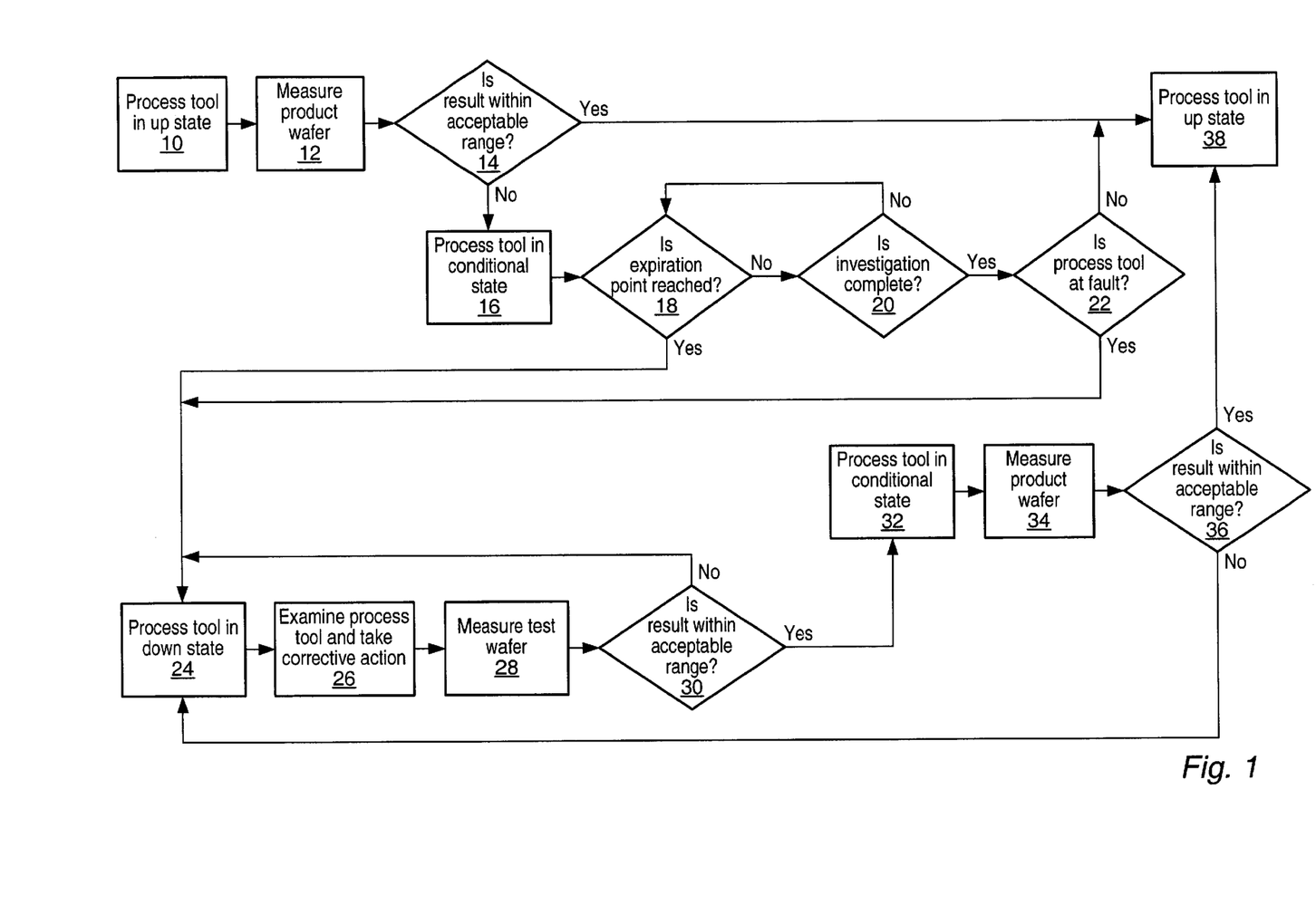
FIG. 1 is a flow diagram for an exemplary procedure for changing the operating state of a process tool in which a measurement result of a product wafer is found to be outside the acceptable range.

Turning to the drawings, a procedure for changing an operating state of a process tool that includes some embodiments of the method recited herein is given in FIG. 1. A process tool is initially in the up state (box 10) and is processing product wafers. At some point in the process flow subsequent to processing by the tool in question, a representative product wafer has a measurement (box 12) performed on it. Several different types of measurements could be made including quantity of defects on the wafer, resistivity of the wafer, or thickness and uniformity of a coating deposited on the wafer. This measurement result is then compared (box 14) to a predetermined acceptable range. If the measurement result is within the acceptable range, the process tool remains in the up state (box 38); otherwise, this tool is placed in the conditional state (box 16). In the case of the result being outside the acceptable range, not only is the process tool depicted in FIG. 1 placed in the conditional state but other process tools that have handled the product wafer with an unacceptable measurement result may be placed in the conditional state as well.

Once the process tool is placed in the conditional state (box 16), personnel must investigate and determine the process tool or tools causing the measurement result to be outside the acceptable range before a predetermined expiration point is reached (box 18). The expiration point may be a time-out period of time or a set number of product wafers handled by the tool. While in the conditional state, the process tool can continue to process product wafers. In the event the process tool is not functioning correctly, the limited period that the tool can remain in the conditional state limits the quantity of defective wafers produced by the tool. The allowable period that the process tool can remain in the conditional state is determined by past performance of the tool. For example, if the tool is rarely responsible for problems with product wafers, the period until the expiration point can be made very long. Conversely, if the tool is often responsible for problems with product wafers, the period until the expiration point can be made very short to reduce the risk of producing defective wafers or set to zero to completely eliminate the risk.

The investigation into determining the process tool responsible for causing the measurement result outside the acceptable range can take many forms. The wafer could be inspected to ascertain the process tool causing the trouble or test wafers could be run on various tools to determine which tool has the problem. Once the investigation is complete (box 20) and a determination (box 22) is made as to the process tool responsible for the measurement result being outside of the acceptable range, this tool is then placed in the down state (box 24) while other tools, which may have been placed in the conditional state without being responsible, are placed back in the up state (box 38). A process tool in the down state is not allowed to process product wafers. Personnel associated with the process tool in the down state then examine the tool and take corrective action (box 26). Once the process tool is believed to be functioning correctly, a test wafer is processed by the tool. The test wafer is then measured (box 28) and this measurement result is compared (box 30) to a predetermined acceptable range. If the measurement result is within the acceptable range, the process tool is placed back up to the conditional state (box 32); otherwise, the tool remains in the down state (box 24). C Typically, the test wafer will be subject to a measurement (box 28) similar to the measurement (box 12) performed on the product wafer.

Once a process tool is back up to the conditional state (box 32), only a predetermined limited number of product wafers are processed by the tool. This product wafer processing is preferably similar to that which caused the tool to be placed in the conditional state (box 16) originally. The product wafer is then measured (box 34) and the measurement result is compared (box 36) to a predetermined acceptable range. If the measurement result is within the acceptable range, then the process tool is placed in the up state (box 38); otherwise, the tool is placed back in the down state (box 32). If the process tool is placed back in the down state, either the original problem on the tool was not fixed or a new problem has been created accidentally.

In another embodiment, if the measurement result is outside the acceptable range (box 36), the process tool can remain in the conditional state (box 32) instead. In this case, the problem with process tool has probably been fixed and a process integration issue is causing the trouble with the process wafers. In yet another embodiment, if the measurement (box 34) and comparison (box 36) are not performed before an expiration point, the tool is then automatically placed in the down state. This expiration point can either be a time-out period of time or a set number of product wafers processed by the tool.

Figure 2:
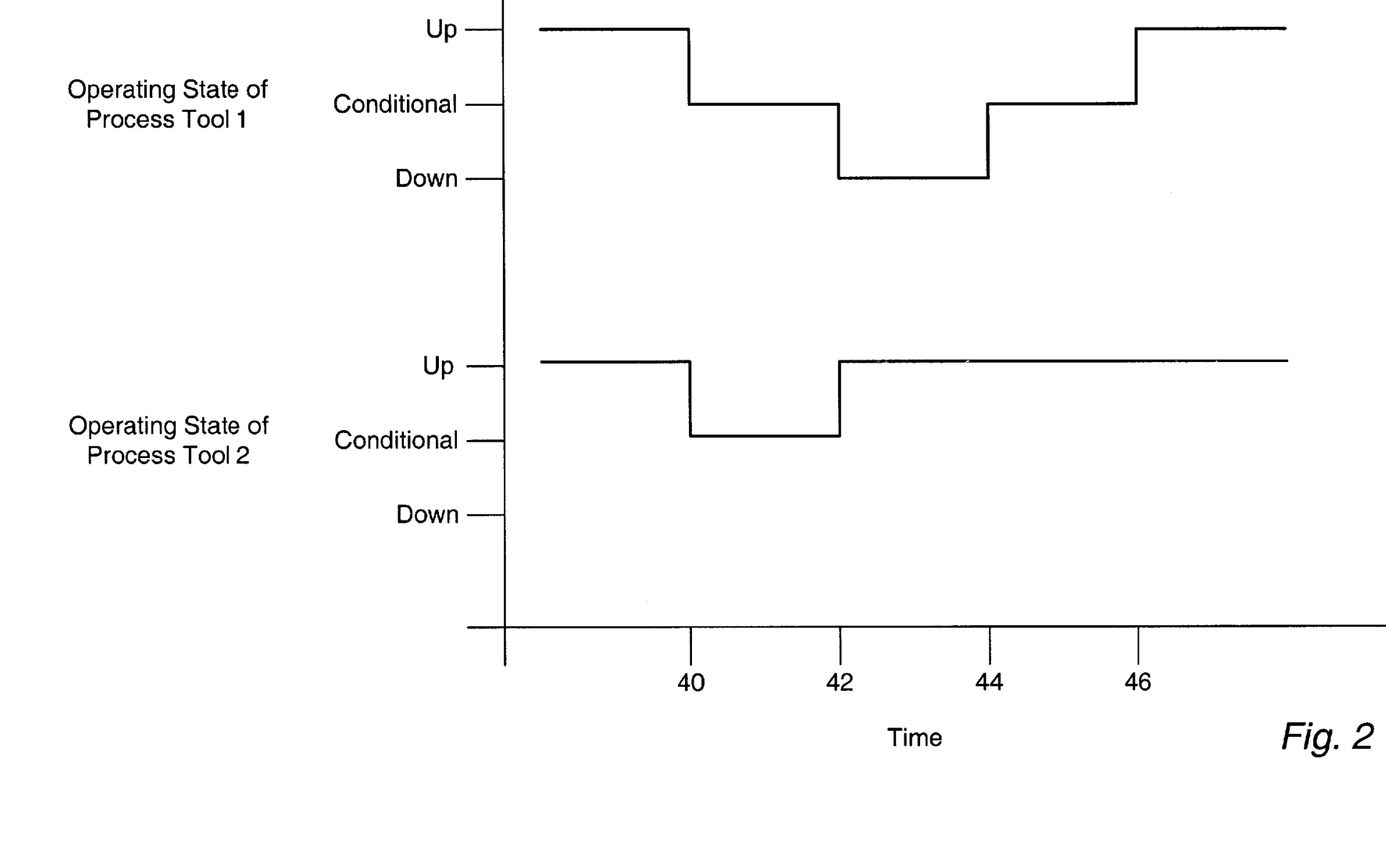
FIG. 2 is a graph showing the operating states of two representative process tools over time in which a measurement result of a product wafer is found to be outside of the acceptable range.

FIG. 2 depicts the operating states of two different process tools over time, corresponding to implementation of some embodiments of the method recited herein. Initially, both process tools are in the up state and are processing product wafers. At time 40, a product wafer that had been processed by both tools is found to have a defect count larger than the maximum acceptable count. Both process tools are then placed in the conditional state while personnel launch an investigation to determine the tool responsible for the unacceptably large defect count. During this time, both tools are allowed to continue handling product wafers. At time 42, personnel conclude that process tool 1 is responsible for the unacceptably large defect count while process tool 2 is operating properly; therefore, they place process tool 1 in the down state while process tool 2 is placed in the up state.

The investigation that concludes process tool 1 is responsible can take many forms. In one possible embodiment, process tool 1 processes a test wafer while process tool 2 processes a different test wafer. Personnel then conclude, based on the defect counts measured on the test wafers, that process tool 1 must have been responsible for the product wafer with the unacceptably large defect count. In another possible embodiment, personnel examine the product wafer with the unacceptably large defect counts and conclude, based on the type and location of the defects, that process tool 1 must have created the defects.

Subsequent to time 42, personnel associated with process tool 1 examine the tool and correct the problem causing the defects on the wafers. At time 44, a test wafer is run on process tool 1. A measurement of the defect count on the test wafer is found to be less than the maximum acceptable count; therefore process tool 1 is placed back up to the conditional state. Subsequent to time 44, process tool 1 handles a predetermined limited number of product wafers that are found at time 46 to have a defect count less than the maximum acceptable count. Process tool 1 is therefore placed in the up state at time 46.

Figure 3:
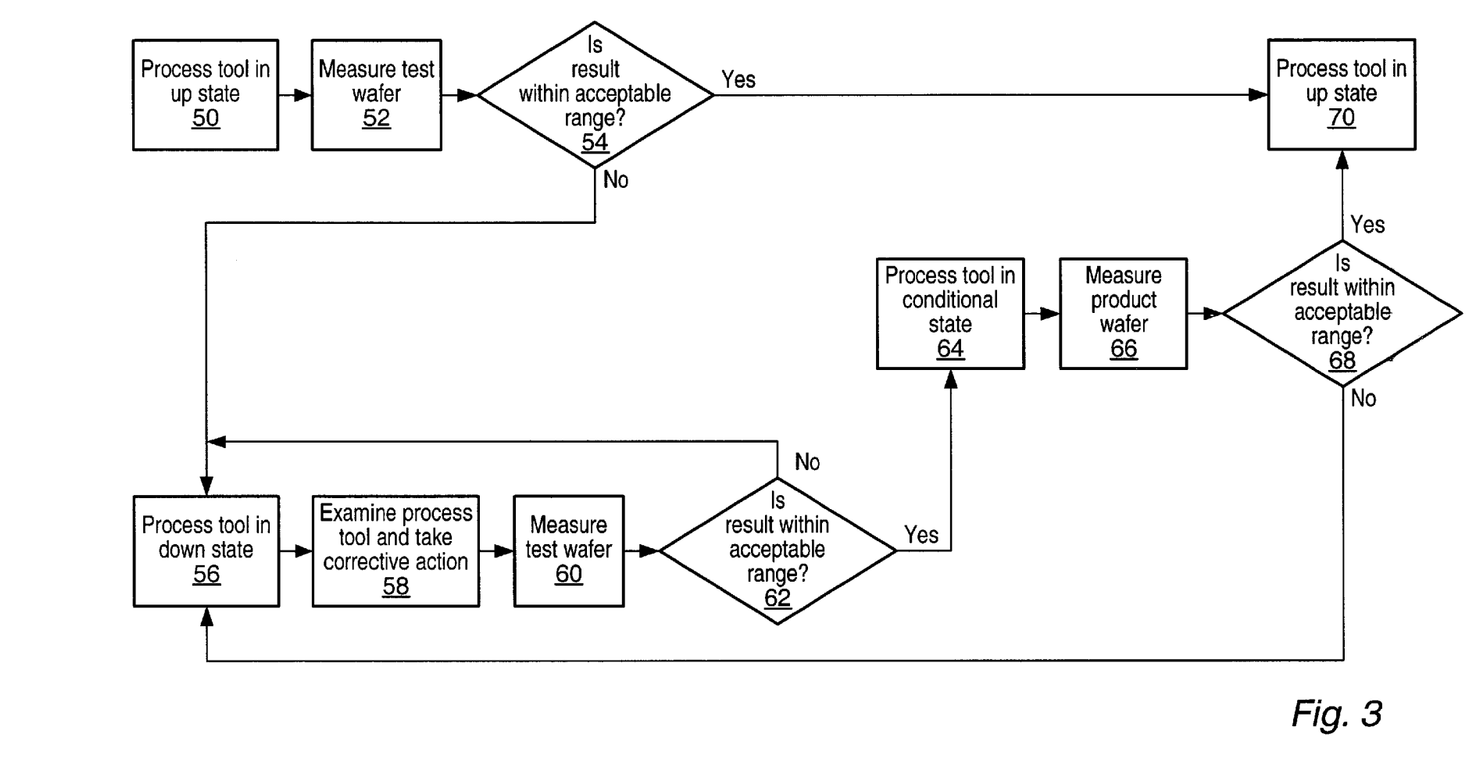
FIG. 3 is a flow diagram for an exemplary procedure for changing the operating state of a process tool in which a measurement result of a test wafer is found to be outside the acceptable range.

FIG. 3 is a flow diagram for a procedure that includes some embodiments of the method recited herein for changing an operating state of a process tool. A process tool is initially in the up state (box 50) and is handling product wafers. A test wafer is run on the process tool as part of a routinely scheduled check of the tool's performance. Some type of measurement (box 52), possibly a defect count or resistivity of the wafer, is then performed on the wafer. The measurement result is then compared (box 54) to a predetermined acceptable range. If the result is within an acceptable range, the process tool remains in the up state (box 70); otherwise, the tool is placed in the down state (box 56). Because the test wafer measurement isolates a particular process tool's performance, no conditional period is needed to determine the tool responsible for the measurement result being outside the acceptable range.

Personnel associated with the process tool in the down state then examine the tool and take corrective action (box 58). Once the process tool is believed to be functioning correctly, another test wafer is processed by the tool. The test wafer is then measured (box 60) and this measurement result is compared (box 62) to a predetermined acceptable range. If the measurement result is within the acceptable range, the process tool is placed back up to the conditional state (box 64); otherwise, the tool remains in the down state (56). It is important that the measurement (box 60) performed while the process tool is in the down state includes the same measurement (box 52) performed while the tool was in the up state. In this way, it is ensured that the original problem is solved.

Once the process tool is in the conditional state (box 64), a predetermined limited number of product wafers are processed by the process tool. These wafers are then measured (box 66) and this measurement result is then compared (box 68) to a predetermined acceptable range. If the measurement result is within the acceptable range, the process tool is placed in the up state (box 70); otherwise, the tool is placed back in the down state (box 56).

Figure 4:
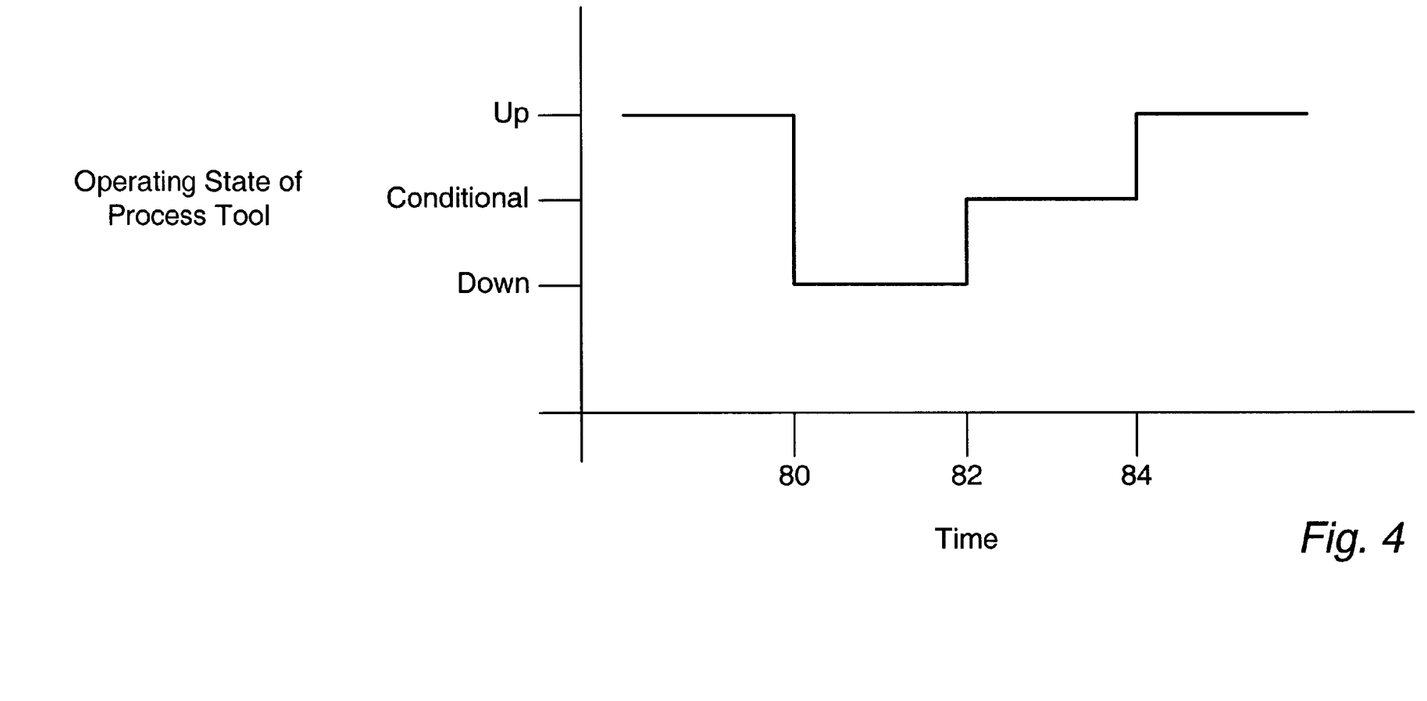
FIG. 4 is a graph showing the operating state of a representative process tool over time in which a measurement result of a test wafer is found to be outside the acceptable range.

FIG. 4 depicts the operating state of a process tool over time, corresponding to implementation of some embodiments recited herein. Initially, the tool is in the up state processing product wafers. At time 80, a test wafer, which is run on the process tool as part of a routinely scheduled check of the tool's performance, is found to have a defect count larger than the maximum acceptable count. The tool is then placed in the down state. Subsequent to time 80, personnel associated with the process tool examine the tool and correct the problem causing the defects on the wafer. At time 82, another test wafer is run on the process tool. A measurement of the defect count on the test wafer is found to be less than the maximum acceptable count and the process tool is placed in the conditional state. Subsequent to time 82, the process tool processes a predetermined limited number of product wafers. At time 84, these product wafers are found to have a defect count less than the maximum acceptable count and the process tool is placed in the up state.

The biggest difference between FIGS. 2 and 4 is that the process tool is placed in the conditional state if a measurement result of a product wafer is outside the acceptable range whereas the tool is placed directly in the down state if a measurement result of a test wafer is outside the acceptable range. Many process tools have handled the product wafer prior to the measurement result outside the acceptable range. Placing the process tools which have processed the product wafer in the conditional state gives personnel time to investigate which tool caused the result outside the acceptable range and place the correct tool in the down state. The test wafer, however, has only been processed by a single process tool to isolate the performance of the tool in question; therefore that tool is placed directly into the down state.

A block diagram of the interconnection of a process tool and a computer system for implementing the method described above is given in FIG. 5. Process tool 90 is connected to computer system 94 by two-way bus 98. Additionally, computer system 94 is connected to I/O unit 92 by bus 100 and system memory 96 by local bus 102. I/O unit 92 can include a keyboard and a monitor for users to input the measurement results of product and test wafers. System memory 96 is either a volatile or non-volatile storage medium which can include a hard disk, a floppy disk, a read-only memory, and a random-access memory in which data and instructions are stored. A portion of the information stored in system memory 96 is shown in memory address space 104. The information in memory address space 104 includes measurement data, target data, evaluation data, a database which includes records of the operating state of process tool 90, and instructions.

Figure 5:
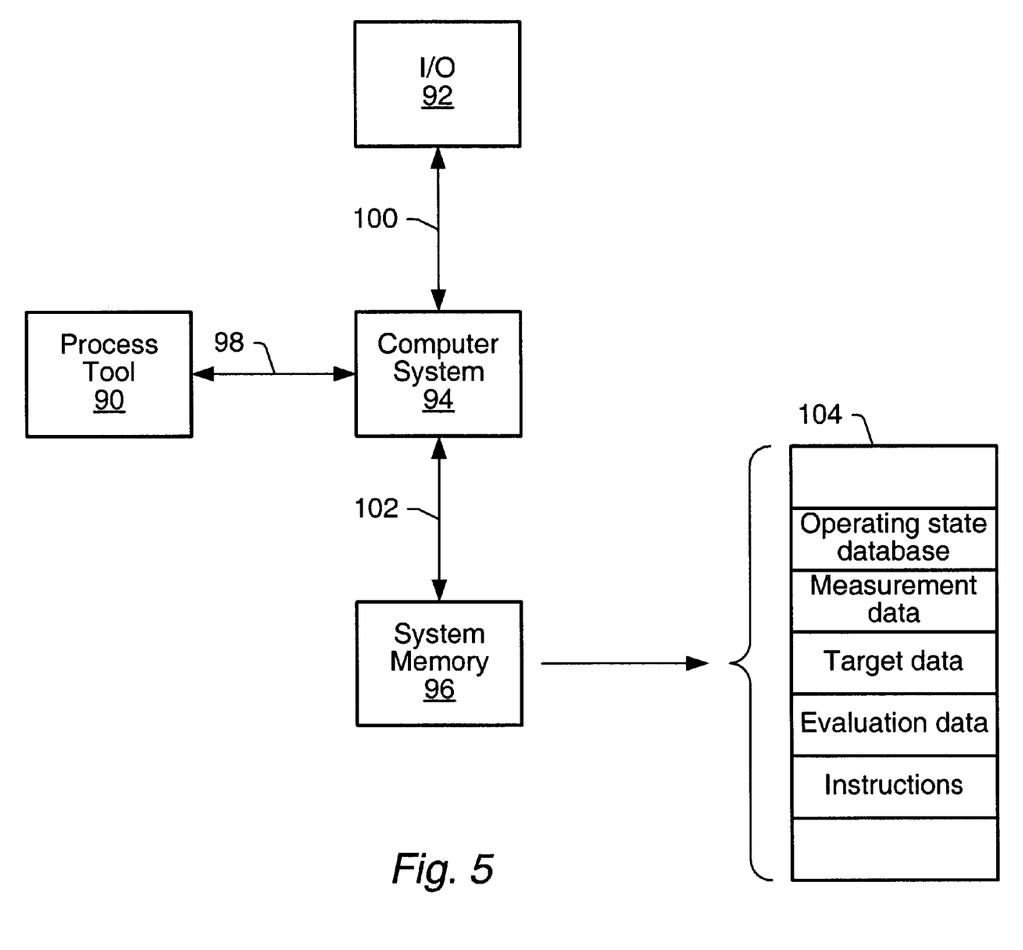
FIG. 5 is an exemplary block diagram of the interconnection of a process tool and a computer system for implementation of the method described herein.

An executable unit in computer system 94 can receive measurement results from I/O unit 92 and dispatch the information to memory address space 104 as measurement data. The target data comprises a predetermined acceptable range for a measurement result. The executable unit can fetch the measurement data and target data from memory address space 104, compare the data, and dispatch evaluation data, which includes whether or not a measurement result falls within the acceptable range, to memory address space 104. The executable unit in computer system 94 can fetch instructions from memory address space 104 and execute those instructions to appropriately modify the record of the operational state of process tool 90. Computer system 94 can then either enable process tool 90 to process product wafers, disable process tool 90 from processing product wafers, or allow process tool 90 to process product wafers until an expiration point is reached depending on whether the record of the operating state of process tool 90 is the up, down, or conditional state, respectively.

It will be appreciated to those skilled in the art having the benefit of this disclosure that this invention is believed to provide a method for increasing the efficiency of integrated circuit manufacture by improvements in manufacturing equipment usage. Further modifications and alternative embodiments of various aspects of the invention will be apparent to those skilled in the art in view of this description. For example, the method recited herein could be done completely manually by keeping track of the state of process tools on paper instead of using an automated factory system. It is intended that the following claims are interpreted to embrace all such modifications and changes and, accordingly, the specification and drawings are to be regarded in an illustrative rather than a restrictive sense.

What is claimed is:

1. A method for determining operating states of one or more integrated circuit process tools, comprising:
   performing manufacturing steps carried forth by the process tools;
   measuring results of the manufacturing steps; and
   setting the process tools according to one of three possible operating states, including a conditional state, depending on the results.

2. The method as recited in claim 1, further comprising comparing the results of said measuring against a predetermined acceptable range.

3. The method as recited in claim 1, wherein said measuring comprises determining a defect count of a product wafer.

4. The method as recited in claim 1, wherein said measuring comprises determining a defect count of a test wafer.

5. The method as recited in claim 1, wherein said setting comprises configuring the process tools in an up state for enabling the process tools to process a plurality of product wafers.

6. The method as recited in claim 1, wherein said setting comprises configuring the process tools in a down state for disabling the process tools from processing a product wafer.

7. The method as recited in claim 6, further comprising examining the process tools and taking corrective action while in said down state.

8. The method as recited in claim 1, wherein said setting comprises configuring the process tools in the conditional state for allowing the process tools to process a plurality of product wafers until an expiration point is reached.

9. The method as recited in claim 8, wherein said expiration point comprises a time-out period of time.

10. The method as recited in claim 8, wherein said expiration point comprises a fixed number of product wafers processed by the process tools.

11. The method as recited in claim 2, wherein said measuring comprises measuring a product wafer, and wherein said comparing comprises determining the result is outside of the predetermined acceptable range, and wherein said setting comprises changing the operating state of the process tools that processed the product wafer from an up state to the conditional state.

12. The method as recited in claim 11, further comprising investigating to determine the process tools' responsibility for the result being outside of the predetermined acceptable range, subsequent to said setting.

13. The method as recited in claim 12, wherein said investigating determines one or more of the process tools caused the result to be outside of the predetermined acceptable range, and further comprising changing the operating state of the responsible process tools from the conditional state to a down state.

14. The method as recited in claim 12, wherein said investigating determines one or more of the process tools did not cause the result to be outside of the predetermined acceptable range, and further comprising changing the operating state of the process tools not responsible from the conditional state to the up state.

15. The method as recited in claim 13, further comprising measuring a result of a test wafer within an additional predetermined acceptable range and changing the operating state of a process tool that processed the test wafer from the down state to the conditional state.

16. The method as recited in claim 15, further comprising allowing the process tool in the conditional state to process only a predetermined limited number of product wafers.

17. The method as recited in claim 15, further comprising measuring a result of a new product wafer within the predetermined acceptable range and changing the operating state of the process tool from the conditional state to the up state.

18. The method as recited in claim 2, wherein said measuring comprises measuring a test wafer, and wherein said comparing comprises determining the result is outside of the predetermined acceptable range, and wherein said setting comprises changing the operating state of a process tool that processed the test wafer from an tip state to a down state.

19. The method as recited in claim 18, further comprising measuring a result of a new test wafer within the predetermined acceptable range and changing the operating state of the process tool from the down state to the conditional state.

20. The method as recited in claim 19, further comprising allowing the process tool in the conditional state to process only a predetermined limited number of product wafers.

21. The method as recited in claim 19, further comprising measuring a result of a product wafer within the predetermined acceptable range and changing the operating state of the process tool from the conditional state to the up state.

22. A system for controlling an integrated circuit manufacturing process, comprising:
   a computer operably linked to a process tool for storing a result derived from the manufacturing process carried forth by the process tool;
   a database, stored within the computer system, adapted for maintaining a record of an operating state of the process tool; and
   a program adapted for execution on the computer system for comparing the result against a target result, and further adapted to modify the record of the operating state depending on the comparison to one of three possible states consisting essentially of an up state, a down state, and a conditional state.

23. The system of claim 22, wherein said program modifies the record of the operating state to the up state for enabling the process tool to process a plurality of product wafers.

24. The system of claim 22, wherein said program modifies the record of the operating state to the down state for disabling the process tool from processing a product wafer.

25. The system of claim 22, wherein said program modifies the record of the operating state to the conditional state for allowing the process tool to process a plurality of product wafers until an expiration point is reached.

26. A computer-readable storage medium having program instructions operable for controlling a process tool used in manufacturing an integrated circuit, said storage medium comprising:

measurement data which corresponds to measurement results taken from the integrated circuit after processing by said process tool;

target data which corresponds to a predetermined acceptable range;

evaluation data which indicates a comparison between the measurement data and the target data; and an instruction based on the evaluation data, wherein said instruction is executably adapted to select between an up state, a down state and a conditional state of the process tool.

27. The storage medium of claim 26, wherein said storage medium comprises a hard disk, a floppy disk, a read-only memory, or a random-access memory.

28. The storage medium of claim 26, wherein said instruction selects the up state for enabling the process tool to process a plurality of product wafers.

29. The storage medium of claim 26, wherein said instruction selects the down state for disabling the process tool from processing a product wafer.

30. The storage medium of claim 26, wherein said instruction selects the conditional state for enabling the process tool to process a plurality of product wafers until an expiration point is reached.

* * * * *

UNITED STATES PATENT AND TRADEMARK OFFICE
CERTIFICATE OF CORRECTION

PATENT NO. : 6,430,456 B1  
DATED : August 6, 2002  
INVENTOR(S) : Black et al.

It is certified that error appears in the above-identified patent and that said Letters Patent is hereby corrected as shown below:

Column 10,
Line 41, delete "tip" and substitute therefor -- up --.

Signed and Sealed this

Twenty-fifth Day of February, 2003

JAMES E. ROGAN
*Director of the United States Patent and Trademark Office*